United States Patent
Wakui et al.

(10) Patent No.: US 11,309,758 B2
(45) Date of Patent: Apr. 19, 2022

(54) ROTATING ELECTRIC MACHINE

(71) Applicant: HONDA MOTOR CO., LTD., Tokyo (JP)

(72) Inventors: Takashi Wakui, Saitama (JP); Yasuhiro Fujita, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 168 days.

(21) Appl. No.: 16/884,692

(22) Filed: May 27, 2020

(65) Prior Publication Data

US 2020/0381968 A1 Dec. 3, 2020

(30) Foreign Application Priority Data

Jun. 3, 2019 (JP) .............................. JP2019-103626

(51) Int. Cl.
*H02K 1/32* (2006.01)
*H02K 1/27* (2006.01)
*H02K 9/19* (2006.01)
*H02K 1/278* (2022.01)

(52) U.S. Cl.
CPC .............. *H02K 1/32* (2013.01); *H02K 1/278* (2013.01); *H02K 9/19* (2013.01)

(58) Field of Classification Search
CPC ............. H02K 9/19; H02K 1/32; H02K 1/278
USPC ......................................................... 310/54
See application file for complete search history.

(56) References Cited

U.S. PATENT DOCUMENTS

2009/0261667 A1* 10/2009 Matsubara ........... H02K 1/2766
310/54

2013/0342049 A1 12/2013 Stridsberg
2016/0261158 A1 9/2016 Horii et al.
2017/0012503 A1* 1/2017 Okochi .................... H02K 1/32
2017/0040872 A1 2/2017 Nitsch et al.
(Continued)

FOREIGN PATENT DOCUMENTS

| JP | S55-051664 U | 4/1980 |
| JP | 2013-193015 A | 9/2013 |
| JP | 6279059 B1 | 2/2018 |

(Continued)

OTHER PUBLICATIONS

Jan. 5, 2021, Japanese Office Action issued for related JP Application No. 2019-103626.

*Primary Examiner* — Alex W Mok (74) *Attorney, Agent, or Firm* — Paratus Law Group, PLLC (57) ABSTRACT

A rotating electric machine includes a rotor and a stator. The rotor includes: a rotor core having a refrigerant flow path; and an end surface plate arranged at least on one side of the rotor core. The refrigerant flow path includes: a first refrigerant flow path; and a second refrigerant flow path which is disposed further on a radial inner side than the first refrigerant flow pat. The stator includes: a stator core; and a coil end portion protruding from at least one side of the stator core. The end surface plate includes: a root side refrigerant supply portion which communicates with the first refrigerant flow path and supplies the refrigerant to a root region of the coil end portion; and a distal side refrigerant supply portion which communicates with the second refrigerant flow path and supplies the refrigerant to a distal region of the coil end portion.

14 Claims, 10 Drawing Sheets

(56) References Cited

U.S. PATENT DOCUMENTS

2018/0152078 A1    5/2018  Yoshinori et al.
2018/0205294 A1*   7/2018  Manabe .................. H02K 9/19

FOREIGN PATENT DOCUMENTS

| JP | 2018-191363 A | | 11/2018 |
|----|----|----|----|
| JP | 2018191363 A | * | 11/2018 |
| WO | WO 2015/087445 A1 | | 6/2015 |

* cited by examiner

ROTATING ELECTRIC MACHINE

CROSS-REFERENCE TO RELATED APPLICATIONS

The present application claims the benefit of priority of Japanese Patent Application No. 2019-103626, filed on Jun. 3, 2019, the content of which is incorporated herein by reference.

TECHNICAL FIELD

The present invention relates to a rotating electric machine mounted on an electric vehicle or the like.

BACKGROUND ART

In recent years, rotating electric machines have been used in hybrid vehicles and EV vehicles. When a rotating electric machine is rotated, the temperature of a coil rises which greatly affects the performance of the rotating electric machine. Therefore, appropriate cooling is required.

In Japanese Patent No. 6279059, liquid refrigerant is discharged from a refrigerant flow path passing through a rotor core and the liquid refrigerant is rotationally scattered along an inner peripheral surface of a bowl-shaped end plate to supply the refrigerant to a coil end portion of a stator. It also describes that the refrigerant flowing through a flow path of the rotor core is discharged from an opening provided in an end surface plate and an outer edge of the end surface plate.

However, in the rotating electric machine described in Japanese Patent No. 6279059, the refrigerant discharged from the opening and the outer edge provided in the end surface plate flows through a common flow passage provided in the rotor core, so there is a possibility that the refrigerant cannot be properly distributed.

SUMMARY

The invention provides a rotating electric machine which can appropriately cool a coil end portion.

According to an aspect of the invention, there is provided a rotating electric machine including: a rotor and a stator facing each other via a predetermined gap in a radial direction, wherein: the rotor includes: a rotor core having a refrigerant flow path through which refrigerant passes; and an end surface plate arranged at least on one side of the rotor core in an axial direction; the refrigerant flow path includes: a first refrigerant flow path in which the refrigerant flows in the axial direction; and a second refrigerant flow path which is disposed further on a radial inner side than the first refrigerant flow path and in which the refrigerant flows in the axial direction; the stator includes: a stator core; and a coil end portion protruding from at least one side of the stator core in the axial direction; and the end surface plate includes: a root side refrigerant supply portion which communicates with the first refrigerant flow path and supplies the refrigerant to a root region of the coil end portion; and a distal side refrigerant supply portion which communicates with the second refrigerant flow path and supplies the refrigerant to a distal region of the coil end portion.

According to the invention, the end surface plate includes the root side refrigerant supply portion which communicates with the first refrigerant flow path of the rotor core and supplies the refrigerant to the root region of the coil end portion and the distal side refrigerant supply portion which communicates with the second refrigerant flow path of the rotor core and supplies the refrigerant to the distal region of the coil end portion. Therefore, by appropriately supplying the refrigerant to both the root region and the distal region of the coil end portion, the coil end portion can be appropriately cooled.

DESCRIPTION OF EMBODIMENTS

Hereinafter, an embodiment of a rotating electric machine of the invention will be described with reference to the drawings.

In the following description, a rotation axis C refers to a center axis when a rotor 10 or a rotor shaft 20 of the rotating electric machine rotates and an axial direction refers to a direction along the rotation axis C. Further, the term "circumferential direction" refers to a direction along a circumference of a circle drawn around a point while the rotation axis C is seen as a point. A radial direction refers to a direction from the point to the circle or a direction from the circle to the point. The term "radially outward" refers to a direction from the point toward the circle. The term "radially inward" refers to a direction from the circle toward the point. Further, thick arrows in the drawing conceptually illustrate the flow of refrigerant.

Figure 1:
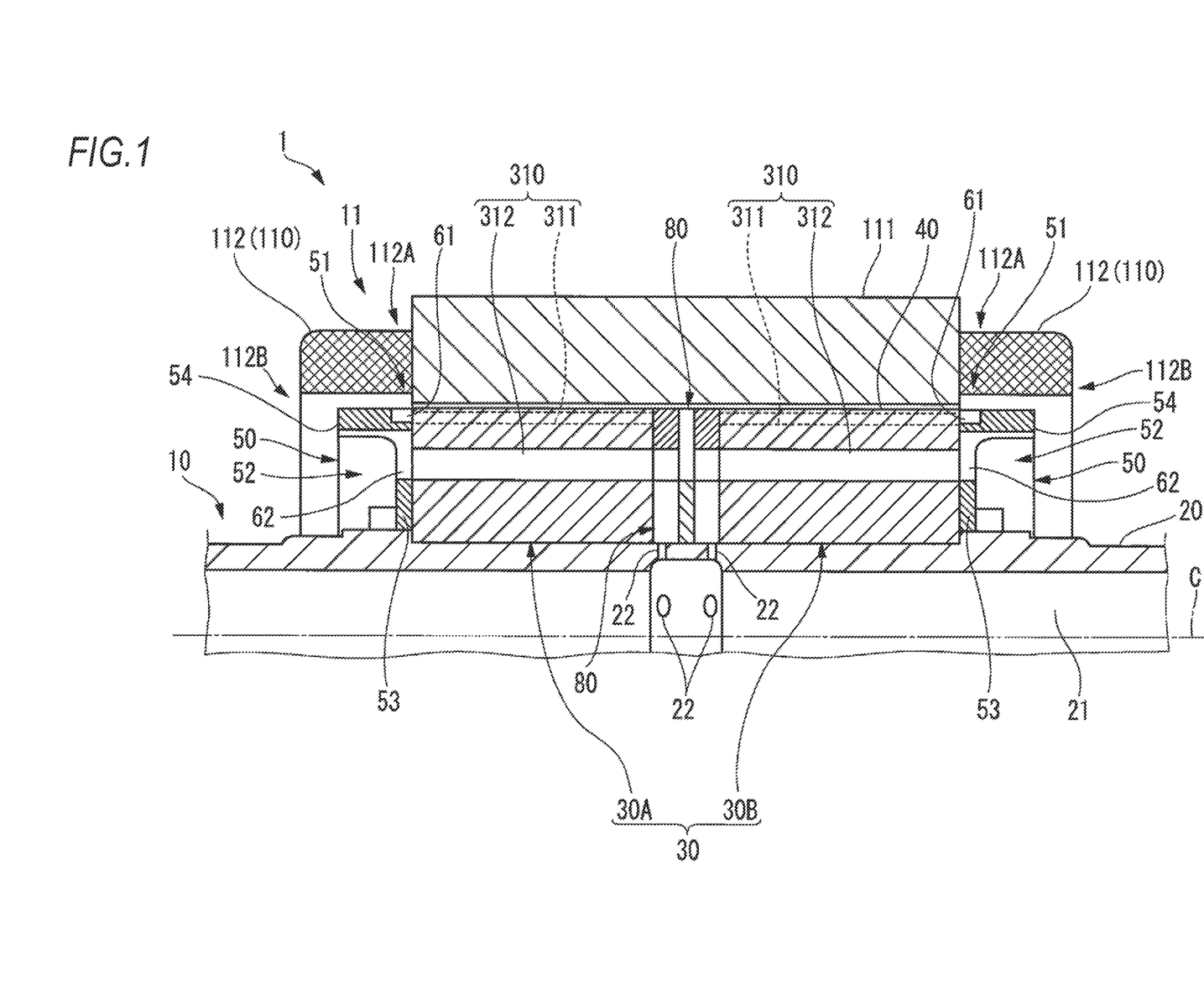
FIG. 1 is a partial cross-sectional view of a rotating electric machine according to an embodiment of the invention.

As illustrated in FIG. 1, a rotating electric machine 1 according to the embodiment is a so-called inner-rotor type rotating electric machine in which the rotor 10 and a stator 11 are provided so as to face each other with a predetermined gap in a radial direction and the stator 11 is arranged radially outside the rotor 10.

As illustrated in FIG. 1, the stator 11 includes a stator core 111 and a coil 110. The coil 110 has coil end portions 112 protruding from both sides of the stator core 111 in an axial direction.

Figure 2:
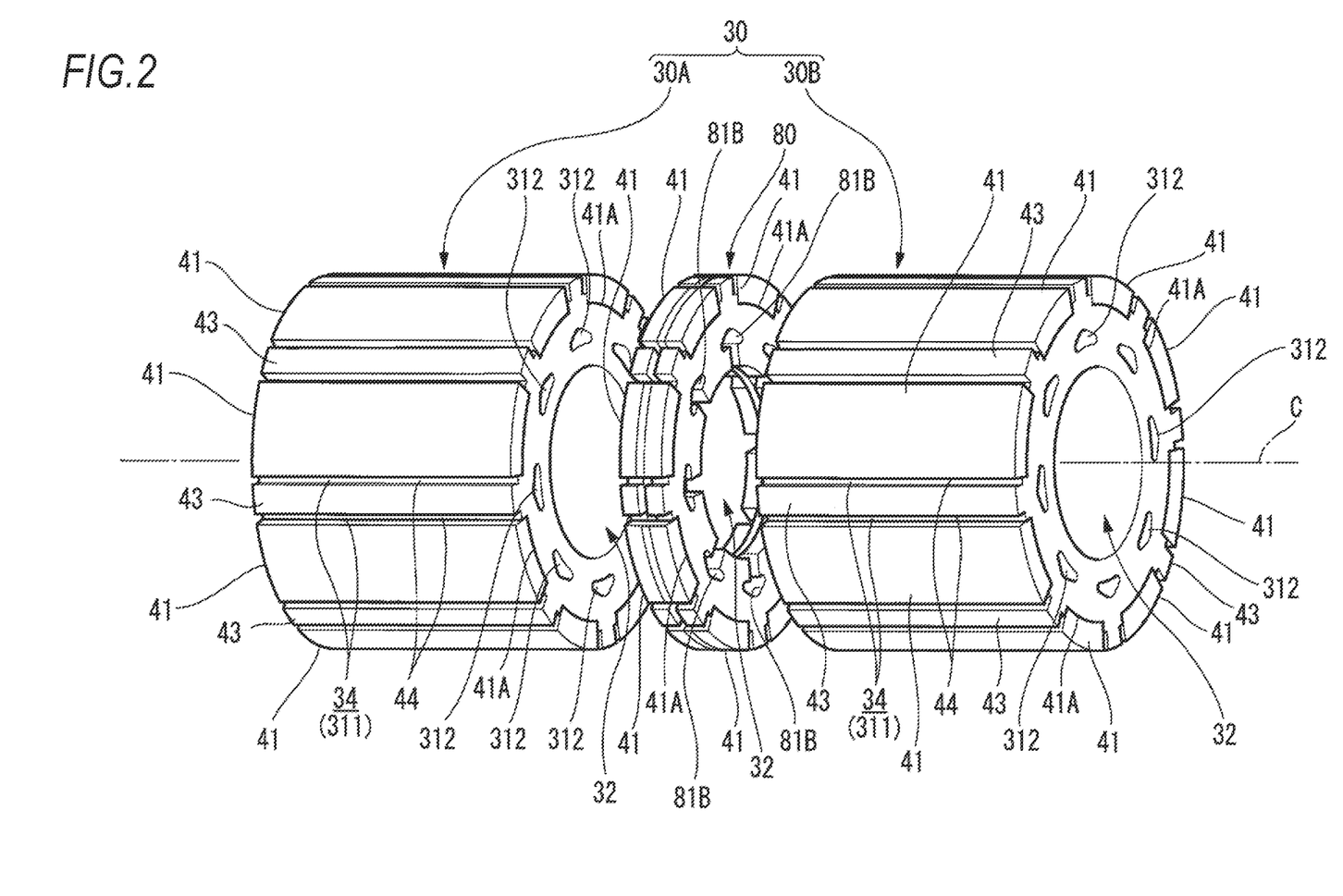
FIG. 2 is an exploded perspective view of a rotor of the rotating electric machine in FIG. 1.

As illustrated in FIGS. 1 and 2, the rotor 10 includes the rotor shaft 20, a rotor core 30 pivotally supported by the rotor shaft 20, a refrigerant distribution plate 80 interposed between the rotor cores 30, and a pair of end surface plates 50 respectively arranged at both ends of the rotor core 30 in the axial direction.

The rotor 10 is a so-called SPM type rotating electric machine in which a magnet 41 is disposed on a surface of the rotor core 30, as illustrated in FIG. 2. The magnets 41 are arranged in magnet attachment grooves 41A provided on an outer peripheral surface of the rotor core 30 and magnet attachment grooves 41A provided on an outer peripheral surface of the refrigerant distribution plate 80. In the rotor 10, a magnetic pole portion is configured by the magnets 41 arranged at the same position in the circumferential direction over the rotor core 30 and the refrigerant distribution plate 80. In the embodiment, eight magnetic pole portions are formed at equal intervals in the circumferential direction. The outer diameter of the rotor core 30 on which the magnets 41 are disposed is set to be substantially the same as the outer diameter of the refrigerant distribution plate 80 on which the magnets 41 are disposed. As illustrated in FIG. 1, a cylindrical filament winding layer 40 is provided on the outer peripheral surfaces of the rotor core 30 and the refrigerant distribution plate 80 to prevent the magnet 41 from coming off the magnet attaching groove 41A. The outer diameter means a distance from the rotation axis C.

As illustrated in FIG. 1, the rotor shaft 20 has an in-shaft flow path 21 through which the refrigerant flows. The in-shaft flow path 21 extends in the axial direction inside the rotor shaft 20 and is configured so that the refrigerant can be supplied from the outside. As the refrigerant, for example, Automatic Transmission Fluid (ATF) is used and a circulation path is formed so that the ATF circulates between the transmission case and the motor housing.

The rotor shaft 20 is formed with one or more refrigerant supply portions 22 for sending the refrigerant from the in-shaft flow path 21 to the rotor core 30 side.

The rotor core 30 is configured by stacking a plurality of electromagnetic steel sheets. The rotor core 30 includes a first rotor core 30A and a second rotor core 30B and the first rotor core 30A and the second rotor core 30B are arranged to face each other across the refrigerant distribution plate 80 in the axial direction. In the embodiment, the refrigerant distribution plate 80 is disposed substantially at the center of the rotor core 30 in the axial direction.

The rotor core 30, the refrigerant distribution plate 80, and the pair of end face plates 60 are formed with shaft insertion holes 32 penetrating in the axial direction at their centers. The rotor shaft 20 is inserted into the shaft insertion holes 32 of the rotor core 30, the refrigerant distribution plate 80, and the pair of end face plates 60 and the rotor shaft 20, the rotor core 30, the refrigerant distribution plate 80, and the pair of end plates 60 are assembled so as to rotate integrally.

The first rotor core 30A and the second rotor core 30B have refrigerant flow paths 310 through which the refrigerant passes. The refrigerant channel 310 includes a first refrigerant flow path 311 through which the refrigerant flows in the axial direction and a second refrigerant flow path 312, which is disposed further on a radial inner side than the first refrigerant flow path 311 and in which the refrigerant flows in the axial direction.

As illustrated in FIG. 2, eight magnet attachment grooves 41A are provided on the outer peripheral surface of the first rotor core 30A and the second rotor core 30B at equal intervals in the circumferential direction. In addition, a partition portion 43 is provided between the magnet attachment grooves 41A adjacent in the circumferential direction and the outer diameter of the partition portion 43 is set to be substantially the same as the outer diameter of the magnet 41 disposed in the magnet attachment groove 41A. On both sides of the magnet attachment groove 41A, shoulder portions 44 larger than the outer diameter of the magnet attachment groove 41A and smaller than the outer diameter of the partition portion 43 are provided and a flux barrier 34 is formed between the partition portion 43 and the side surface of the magnet 41 by the shoulder portion 44.

The first refrigerant flow path 311 is configured by covering the flux barrier 34 with the filament winding layer 40. In the embodiment, sixteen first refrigerant flow paths 311, the same number as the flux barriers 34, are formed. As described above, by forming the first refrigerant flow path 311 using the flux barrier 34, it is possible to prevent the manufacture of the rotor core 30 from becoming complicated.

In other words, since the first refrigerant flow path 311 is configured by covering the flux barrier 34 with the filament winding layer 40, even in the SPM type rotating electric machine 1, the first refrigerant flow path 311 can be formed using the flux barrier 34.

As illustrated in FIG. 2, the second refrigerant flow paths 312 are formed at equal intervals in the circumferential direction inside the first rotor core 30A and the second rotor core 30B. In the embodiment, eight second refrigerant flow paths 312 are formed. The second refrigerant flow path 312 is located between the magnetic pole portions (magnets 41) which are adjacent in the circumferential direction. In this way, since the second refrigerant flow path 312 is located between the magnetic pole portions adjacent in the circumferential direction, both the magnetic pole portions adjacent in the circumferential direction can be cooled by the refrigerant passing through the second refrigerant flow path 312.

Figure 3:
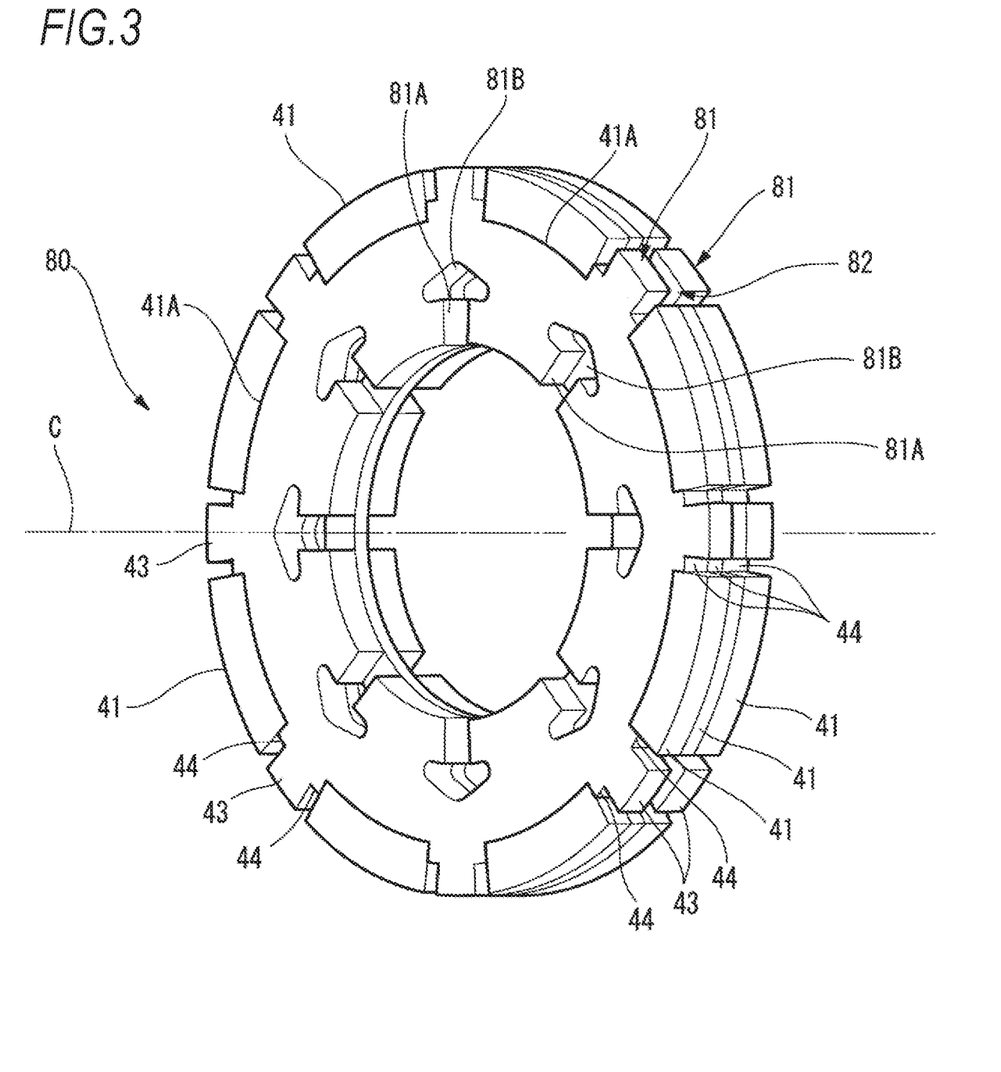
FIG. 3 is a perspective view of a refrigerant distribution plate of the rotor of FIG. 2.

As illustrated in FIG. 3, the refrigerant distribution plate 80 is formed of a pair of first refrigerant distribution plates 81 and a second refrigerant distribution plate 82 interposed between the pair of first refrigerant distribution plates 81. The first refrigerant distribution plate 81 and the second refrigerant distribution plate 82 are stacked in the axial direction.

The first refrigerant distribution plate 81 has a first refrigerant reservoir portion 81B provided to overlap with the second refrigerant flow path 312 (FIG. 2) in the circumferential direction of the rotor core 30 and an inner diameter side refrigerant flow path 81A extending from the in-shaft flow path 21 to the first refrigerant reservoir portion 81B when viewed from the axial direction. On the outer peripheral surface of the first refrigerant distribution plate 81, the magnet attachment groove 41A, the partition portion 43, and the shoulder portion 44 are provided at the same circumferential position as the magnet attachment groove 41A, the partition portion 43, and the shoulder portion 44 of the rotor core 30.

Figure 4:
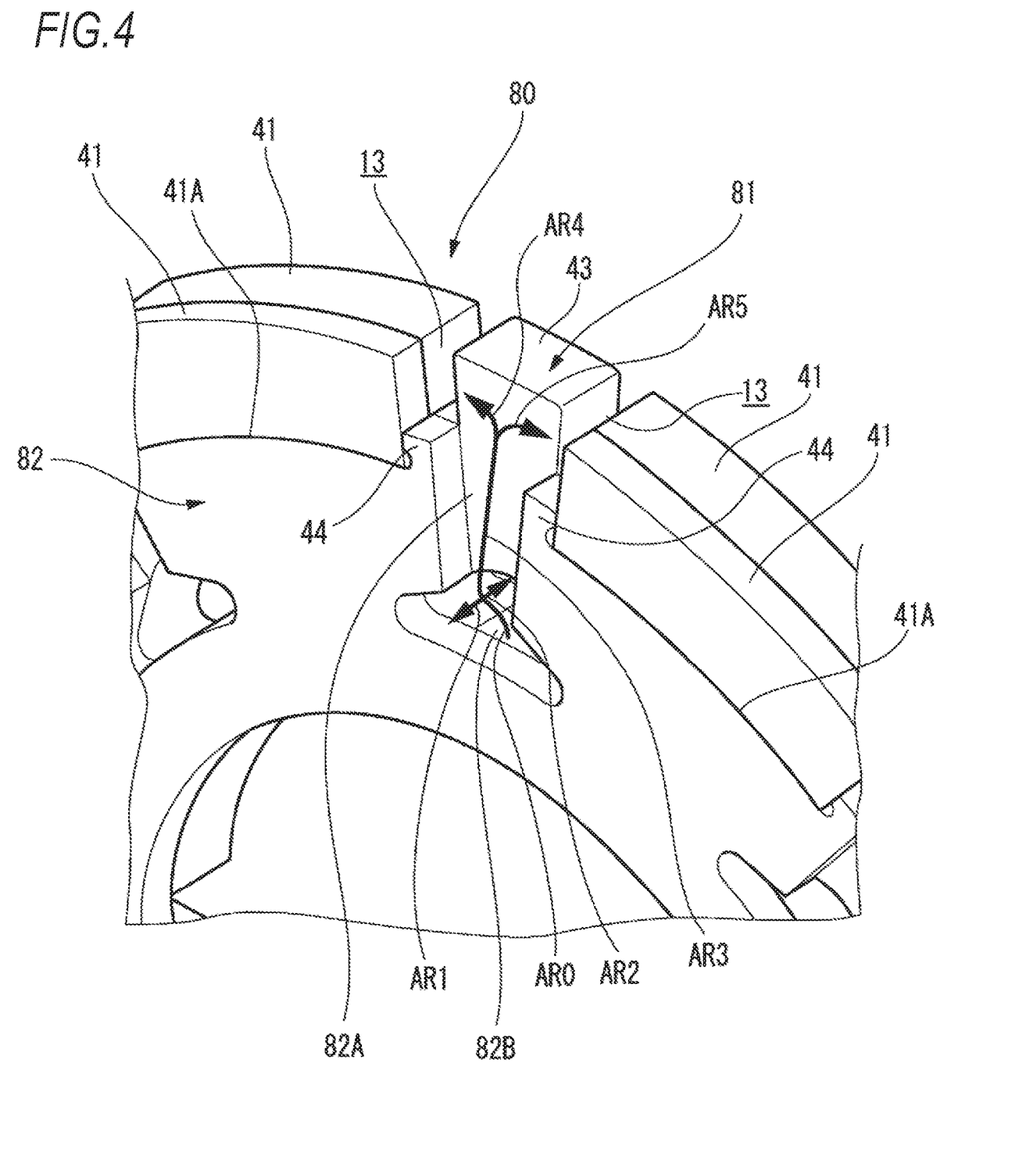
FIG. 4 is an exploded perspective view in which a part of a refrigerant distribution plate is exploded for explaining an outer diameter side refrigerant flow path.

As illustrated in FIG. 4, the second refrigerant distribution plate 82 has a second refrigerant reservoir portion 82B provided to overlap with the second refrigerant flow path 312 in the circumferential direction of the rotor core 30 and an outer diameter side refrigerant flow path 82A extending from the second refrigerant reservoir portion 82B to the outer peripheral surface. On the outer peripheral surface of the second refrigerant distribution plate 82, the magnet attachment groove 41A is provided at the same position in the circumferential direction as the magnet attachment groove 41A of the rotor core 30. In addition, outlets of the outer diameter side refrigerant flow path 82A are provided between adjacent magnet attachment grooves 41A in the circumferential direction with the shoulder portions 44 provided on both sides of magnet attachment groove 41A interposed therebetween. That is, the second refrigerant distribution plate 82 does not have the partition portion 43 and a space 13 communicating with the first refrigerant flow path 311 (FIG. 1) is formed between the outer peripheral surface (shoulder portion 44) of the second refrigerant distribution plate 82 and the filament winding layer 40 (FIG. 1).

Figure 5:
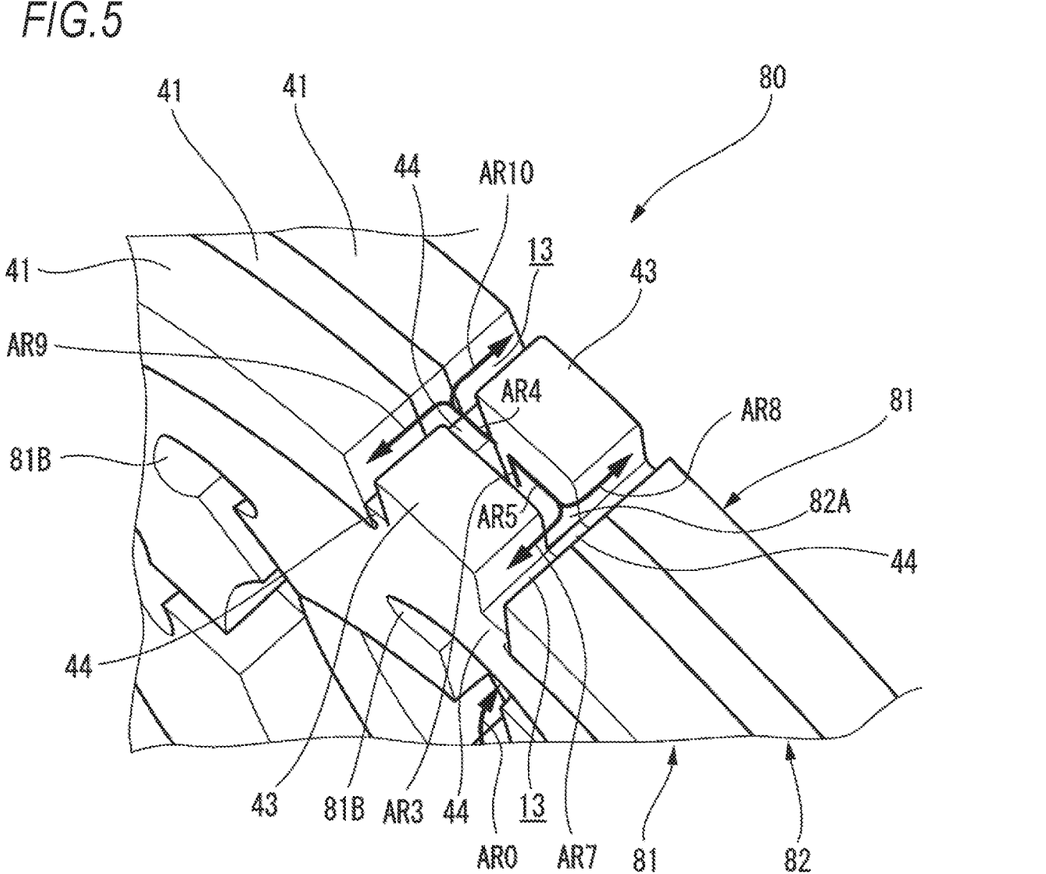
FIG. 5 is an enlarged view of a part of the refrigerant distribution plate.

Here, the refrigerant flowing through the refrigerant distribution plate 80 will be described with reference to FIG. 4 and FIG. 5. The refrigerant flowing through the inner diameter side refrigerant flow path 81A of the first refrigerant distribution plate 81 in a direction of an arrow AR0 temporarily stays in the first refrigerant reservoir portion 81B and the second refrigerant reservoir portion 82B and a part of the refrigerant is supplied to the second refrigerant flow paths 312 of the first rotor core 30A and the second rotor core 30B as indicated by arrows AR1 and AR2.

Further, the remainder of the refrigerant temporarily staying in the first refrigerant reservoir portion 81B and the second refrigerant reservoir portion 82B flows through the outer diameter side refrigerant flow path 82A as indicated by an arrow AR3 and hits the filament winding layer 40 (FIG. 1). Thereafter, as indicated by arrows AR4 and AR5, the flow is changed to flow toward both sides in the circumferential direction. Then, the refrigerant hits the side surface of the magnet 41, changes the flow so as to flow toward both sides in the axial direction, and is supplied to the first refrigerant flow paths 311 of the first rotor core 30A and the second rotor core 30B. That is, the flow of the refrigerant indicated by the arrow AR4 is branched as indicated by arrows AR9 and AR10 and travels along the side surface of the magnet 41 toward the first refrigerant flow path 311 and the first refrigerant flow path 311 of the second rotor core 30B. Further, the flow of the refrigerant indicated by the arrow AR5 is directed to the first refrigerant flow path 311 and the first refrigerant flow path 311 of the second rotor core 30B along the side surface of the magnet 41 as indicated by arrows AR7 and AR8.

In this way, the refrigerant flowing through the in-shaft flow path 21 is distributed to the flows of the plural paths in the refrigerant distribution plate 80 and supplied to the first refrigerant flow path 311 and the second refrigerant flow path 312.

Figure 7:
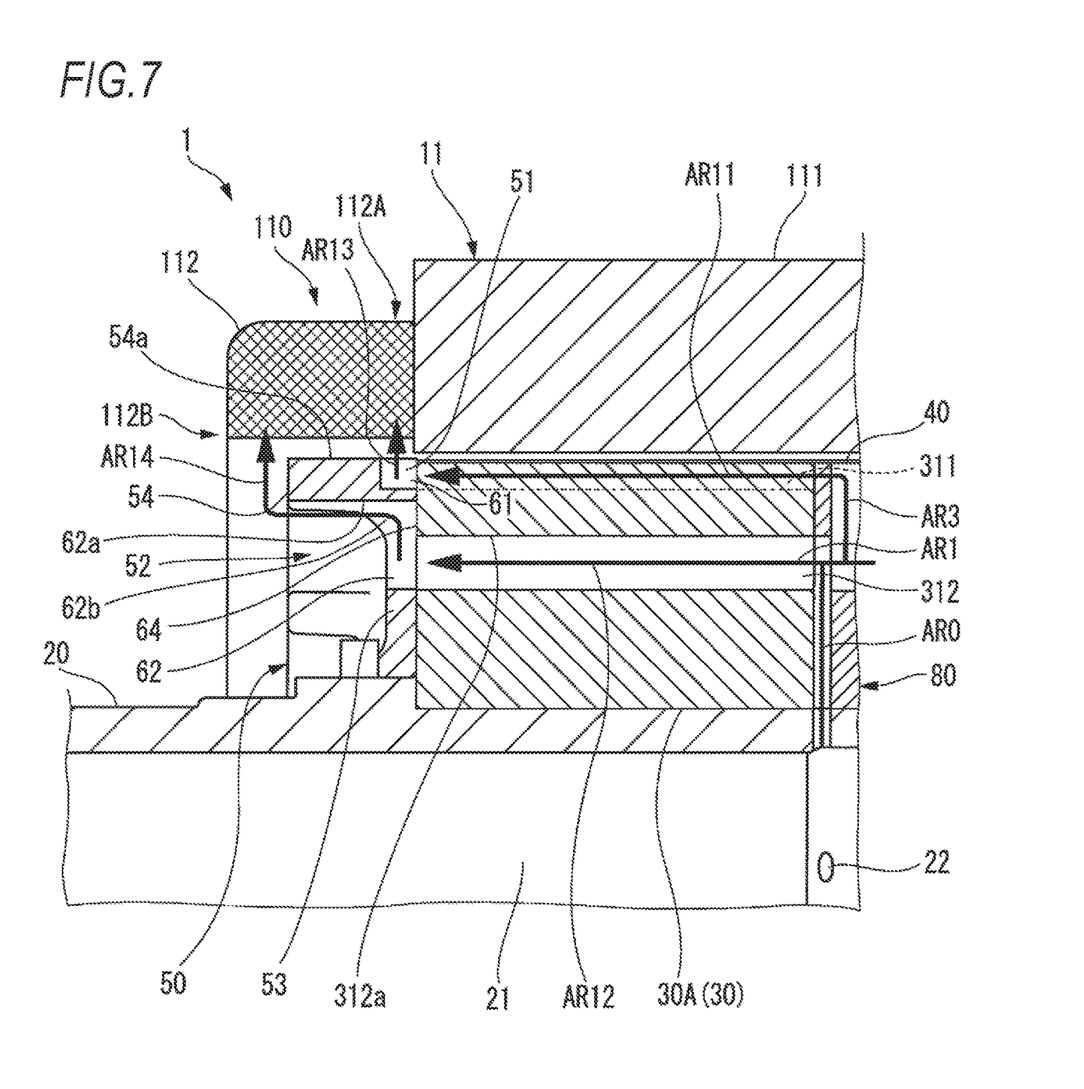
FIG. 7 is an enlarged view in which a part of FIG. 1 is enlarged.

As illustrated in FIG. 7, the refrigerant supplied to the first refrigerant flow path 311 and the second refrigerant flow path 312 flows toward the end surface plates 50 on both sides as indicated by arrows AR1*l* and AR12. In the following description, only the first rotor core 30A side is shown because the first rotor core 30A and the second rotor core 30B are bilaterally symmetric, but it goes without saying that the same applies to the second rotor core 30B side.

Figure 6:
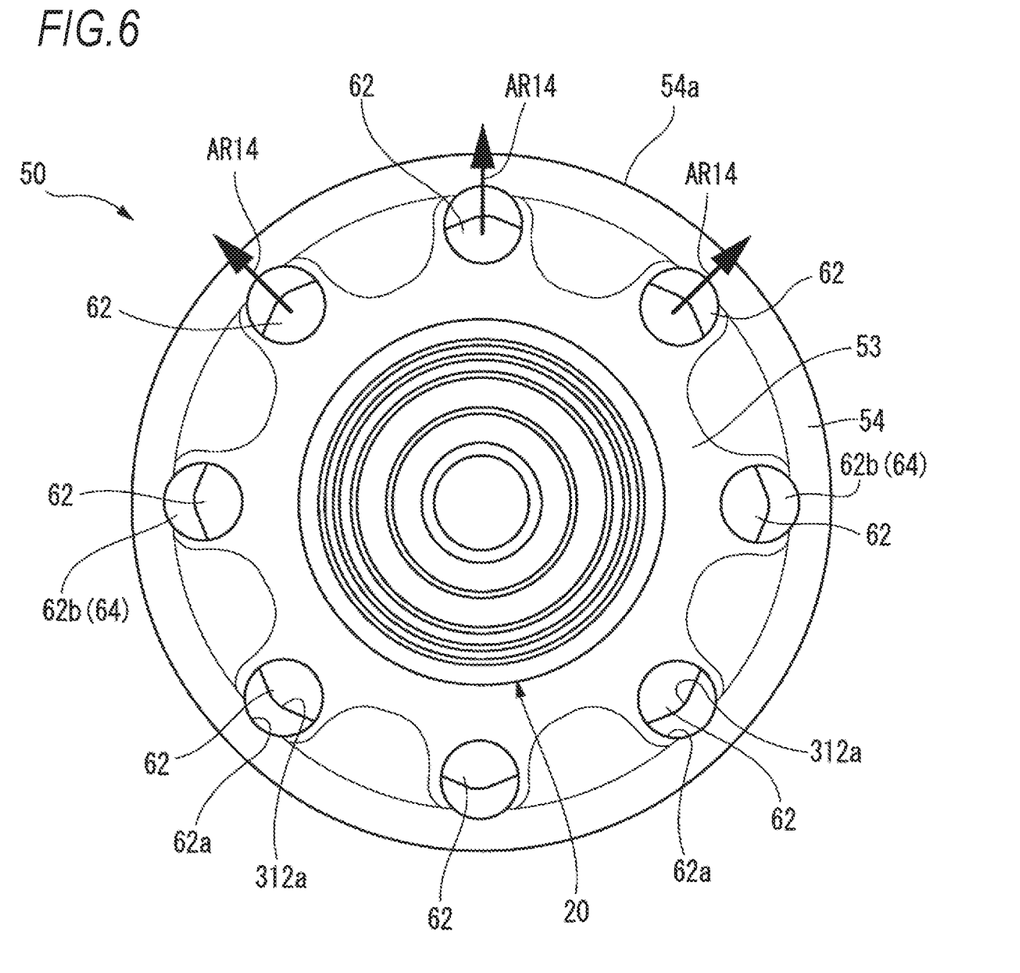
FIG. 6 is a view of an end surface plate of the rotating electric machine of FIG. 1 as viewed from an axial direction.

As illustrated in FIGS. 1, 6, and 7, the end surface plate 50 includes an annular plate portion 53 extending along the outer surface of the rotor core 30 and a cylindrical tubular portion 54 protruding axially outward from the outer peripheral edge of the annular plate portion 53. A root side refrigerant supply portion 51 which communicates with the first refrigerant flow path 311 and supplies the refrigerant to a root region 112A of the coil end portion 112 is provided on an outer peripheral surface 54a of the tubular portion 54. In addition, in the annular plate portion 53, a distal side refrigerant supply portion 52 which communicates with the second refrigerant flow path 312 and supplies the refrigerant to a distal region 112B of the coil end portion 112 is provided further on an inner side than the outer peripheral surface 54a of the tubular portion 54 in a radial direction.

Therefore, the refrigerant flowing through the first refrigerant flow path 311 indicated by the arrow AR11 is supplied from the root side refrigerant supply portion 51 to the root region 112A of the coil end portion 112, as indicated by an arrow AR13. Further, the refrigerant flowing through the second refrigerant flow path 312 indicated by an arrow AR12 is supplied from the distal side refrigerant supply portion 52 to the distal region 112B of the coil end portion 112 as indicated by an arrow AR14. In this way, the end surface plate 50 includes a root side refrigerant supply portion 51 which supplies the refrigerant to the root region 112A of the coil end portion 112 and the distal side refrigerant supply portion 52 which supplies the refrigerant to the distal region 112B of the coil end portion 112. As a result, by appropriately supplying the refrigerant to both the root region 112A and the distal region 112B of the coil end portion 112, the coil end portion 112 can be cooled uniformly.

In addition, the root side refrigerant supply portion 51 communicates with the first refrigerant flow path 311 and the distal side refrigerant supply portion 52 communicates with the second refrigerant flow path 312. Compared with a case where the refrigerant is supplied from the common refrigerant flow path to the root side refrigerant supply portion 51 and the distal side refrigerant supply portion 52, it becomes easy to adjust the amount of refrigerant supplied to the root side refrigerant supply portion 51 and the amount of refrigerant supplied to the distal side refrigerant supply portion 52.

As illustrated in FIG. 7, the root side refrigerant supply portion 51 is a first supply hole 61 formed by a notch or a through-hole provided in the outer peripheral surface 54a of the tubular portion 54 which is an outer peripheral surface of the end surface plate 50 and the distal side refrigerant supply portion 52 is a second supply hole 62 formed by a through-hole penetrating the annular plate portion 53 of the end surface plate 50 in the axial direction. As described above, the first supply hole 61 is provided on the outer peripheral surface 54a of the tubular portion 54, so that by adjusting the position of the first supply hole 61, the refrigerant can be appropriately discharged to a target region. Also, the second supply hole 62 is provided in the annular plate portion 53. Therefore, by adjusting the length of the tubular portion 54 in the axial direction, it is possible to adjust the position of the distal region 112B of the coil end portion 112 where the refrigerant discharged from the second supply hole 62 hits.

A plurality of first supply holes 61 are arranged on the outer peripheral surface of the end surface plate 50 in a predetermined pattern in the circumferential direction. The predetermined pattern means that the pattern has regularity in the circumferential direction. Since the plurality of first supply holes 61 are arranged in a predetermined pattern in the circumferential direction, the refrigerant can be uniformly discharged over the entire circumference to cool the root region 112A of the coil end portion 112. The first supply holes 61 may be arranged at predetermined intervals in the circumferential direction, that is, at equal intervals. Further, it is preferable that the plurality of first supply holes 61 have the same shape. As a result, the refrigerant can be more uniformly discharged over the entire circumference and the root region 112A of the coil end portion 112 can be cooled.

A plurality of second supply holes 62 are arranged at the same position in the radial direction and at predetermined intervals in the circumferential direction. As described above, since the plurality of second supply holes 62 are arranged at the same position in the radial direction and at predetermined intervals in the circumferential direction, the refrigerant is discharged uniformly over the entire circumference and the distal region 112B of the coil end portion 112 can be cooled. The plurality of second supply holes 62 may be arranged in a predetermined pattern in the circumferential direction.

As illustrated in FIG. 7, an outer diameter side wall portion 62a of the second supply hole 62 is located further on a radial outer side than an outer diameter side wall portion 312a of the second refrigerant flow path 312. In addition, by a step portion 64 formed between the outer diameter side wall portion 62a of the second supply hole 62 and the outer diameter side wall portion 312a of the second refrigerant flow path 312, a reservoir portion 62b for storing the refrigerant discharged from the second refrigerant flow path 312 is provided. Since the second supply hole 62 is provided with the reservoir portion 62b, the refrigerant discharged from the second refrigerant flow path 312 can be temporarily stored. Further, by forming the step portion 64 between the outer diameter side wall portion 62a of the second supply hole 62 and the outer diameter side wall portion 312a of the second refrigerant flow path 312, the reservoir portion 62b can be easily formed.

Figure 8:
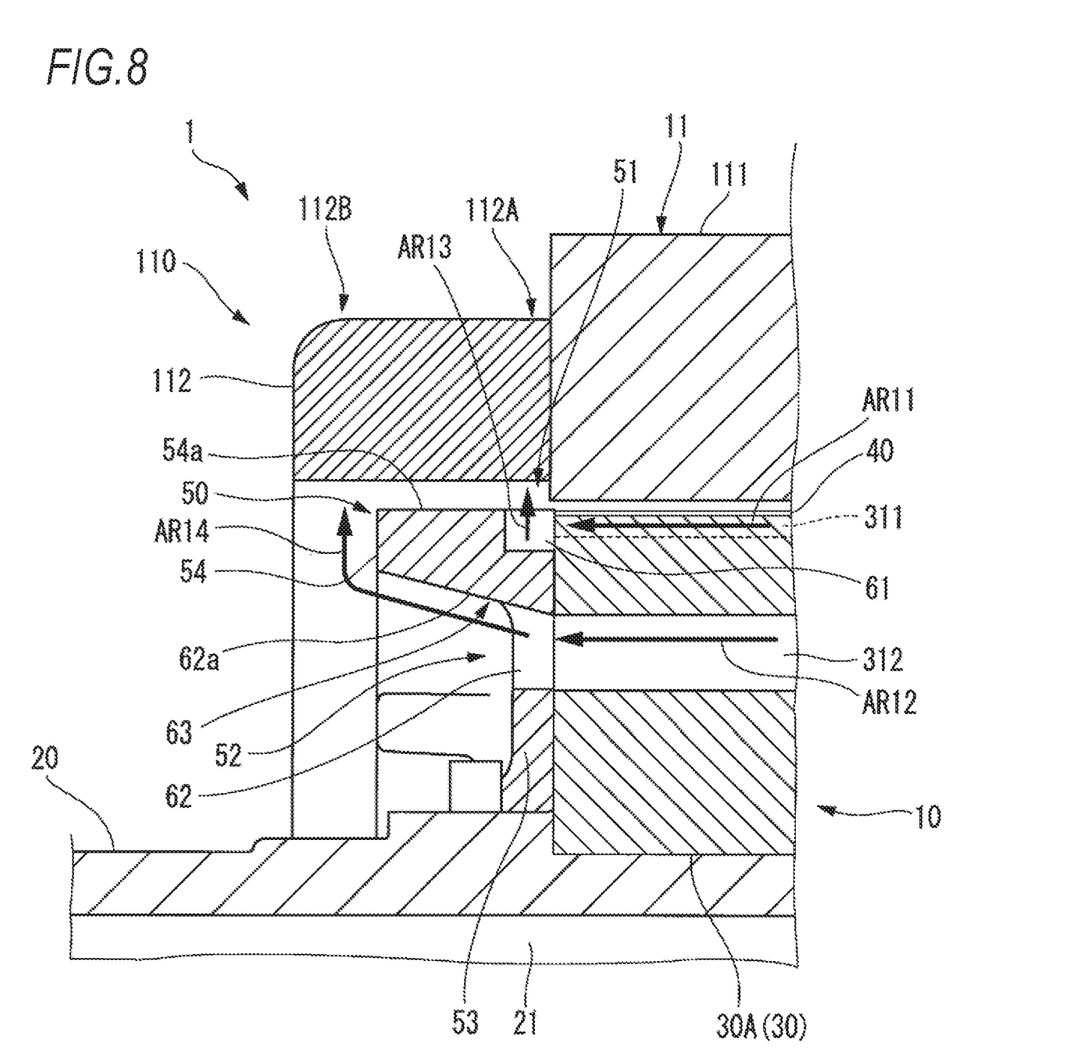
FIG. 8 is a partial cross-sectional view of the rotating electric machine including an end surface plate according to a first modification example of the invention.

Next, an end surface plate 50 according to a modification example of the invention will be described with reference to FIGS. 8 to 10. In the end surface plate 50 of a first modification example, the second supply hole 62 is provided with a refrigerant guide portion 63 for guiding the refrigerant discharged from the second refrigerant flow path 312 toward the distal region 112B side of the coil end portion 112. The refrigerant guide portion 63 is configured such that the outer diameter side wall portion 62a of the second supply hole 62 is inclined or curved radially outward from the second refrigerant flow path 312 toward the distal region 112B side of the coil end portion 112. According to this configuration, the refrigerant discharged from the second refrigerant flow path 312 can be guided toward the distal region 112B side of the coil end portion 112 by the refrigerant guide portion 63 formed by the inclined surface or the curved surface of the outer diameter side wall portion 62a of the second supply hole 62.

Figure 9:
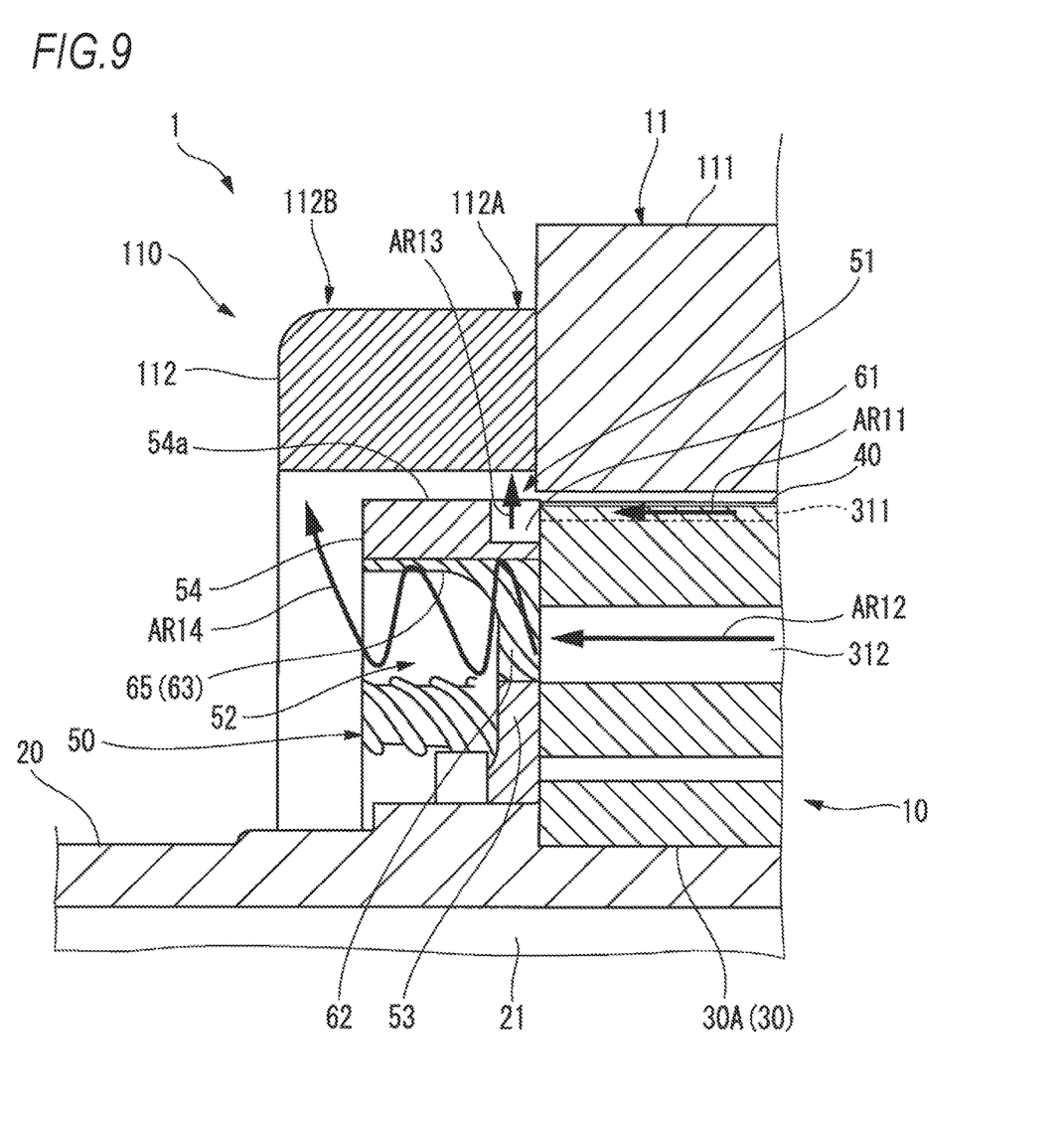
FIG. 9 is a partial cross-sectional view of a rotating electric machine including an end surface plate according to a second modification example of the invention.
Figure 10:
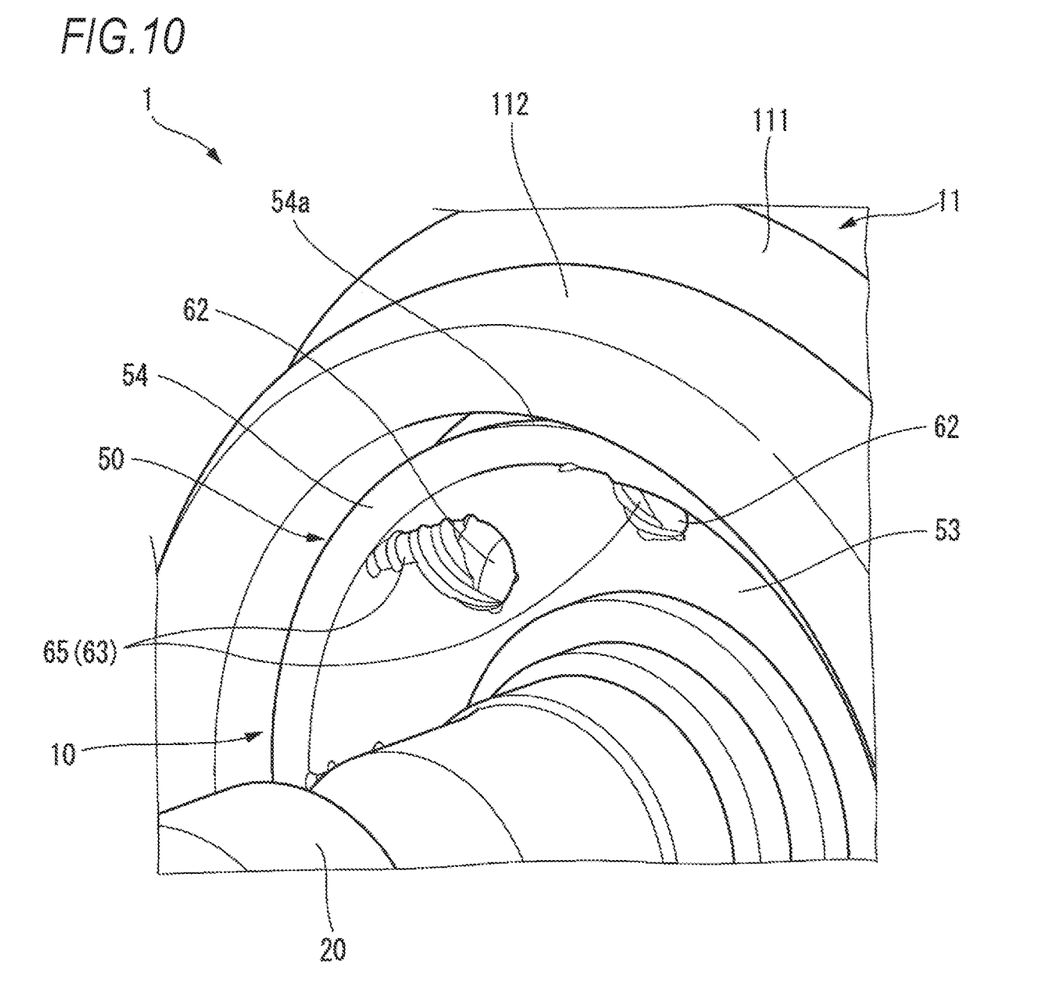
FIG. 10 is an enlarged perspective view illustrating a part of the rotating electric machine of FIG. 9 in an enlarged manner.

As illustrated in FIGS. 9 and 10, in the end surface plate 50 of a second modification example, the refrigerant guide portion 63 is formed by a spiral groove 65 provided on the inner peripheral surface of the second supply hole 62. According to this configuration, the refrigerant discharged from the second refrigerant flow path 312 can be guided toward the distal region 112B side of the coil end portion 112 by the refrigerant guide portion 63 formed by the spiral groove 65 on the inner peripheral surface of the second supply hole 62.

Hereinbefore, the embodiments of the invention are described. However, the invention is not limited to the embodiments described above and modifications, improvements, and the like can be appropriately made.

Further, in the embodiment described above, the end surface plates 50 are disposed on both sides of the rotor core 30 in the axial direction. However, the end surface plate 50 may be disposed on at least one side of the rotor core 30 in the axial direction.

In the embodiments described above, one magnetic pole portion is configured by one magnet 41. However, the invention is not limited to this and one magnetic pole portion may be configured by two or more magnets 41. Further, the rotating electric machine is not limited to a Surface Permanent Magnet Motor (SPM) type rotating electric machine and may be an Interior Permanent Magnet Motor (IPM) type rotating electric machine.

In addition, at least the following matters are described in this specification. In the parentheses, components and the like corresponding to those of the embodiments described above are shown, but the invention is not limited to this.

(1) A rotating electric machine (rotating electric machine 1) which includes a rotor (rotor 10) and a stator (stator 11) facing each other via a predetermined gap in a radial direction, where
the rotor includes,
a rotor core (rotor core 30) having a refrigerant flow path (refrigerant flow path 310) through which refrigerant passes, and
an end surface plate (end surface plate 50) arranged at least on one side of the rotor core in an axial direction,
the refrigerant flow path includes,
a first refrigerant flow path (first refrigerant flow path 311) in which the refrigerant flows in the axial direction, and
a second refrigerant flow path (second refrigerant flow path 312) which is disposed further on a radial inner side than the first refrigerant flow path and in which the refrigerant flows in the axial direction,
the stator includes,
a stator core (stator core 111), and
a coil end portion (coil end portion 112) protruding from at least one side of the stator core in the axial direction, and
the end surface plate includes,
a root side refrigerant supply portion (root side refrigerant supply portion 51) which communicates with the first refrigerant flow path and supplies the refrigerant to a root region (root region 112A) of the coil end portion, and
a distal side refrigerant supply portion (distal side refrigerant supply portion 52) which communicates with the second refrigerant flow path and supplies the refrigerant to a distal region (distal region 112B) of the coil end portion.

According to (1), the end surface plate includes the root side refrigerant supply portion which supplies refrigerant to the root region of the coil end portion and the distal side refrigerant supply portion which supplies refrigerant to the distal region of the coil end portion. Therefore, by cooling both the root region and the distal region of the coil end portion, the coil end portion can be appropriately cooled. Also, the root side refrigerant supply portion communicates with the first refrigerant flow path and the distal side refrigerant supply portion communicates with the second refrigerant flow path. Therefore, compared to a case where the refrigerant is supplied from a common refrigerant flow path to the root side refrigerant supply portion and the distal side refrigerant supply portion, it is easy to adjust the amount of refrigerant supplied to the root side refrigerant supply portion and the amount of refrigerant supplied to the distal side refrigerant supply portion.

(2) The rotating electric machine according to (1), where
the root side refrigerant supply portion is a first supply hole (first supply hole 61) formed of a notch or a through-hole provided on an outer peripheral surface of the end surface plate, and
the distal side refrigerant supply portion is a second supply hole (second supply hole 62) formed of a through-hole penetrating the end surface plate from the axial direction.

According to (2), the root side refrigerant supply portion is the first supply hole formed of the notch or the through-hole provided on the outer peripheral surface of the end surface plate and the distal side refrigerant supply portion is the second supply hole formed of the through-hole penetrating the end surface plate from the axial direction. Therefore, the refrigerant can be appropriately discharged to the target area.

(3) The rotating electric machine according to (2), where
a plurality of the first supply holes are provided, and
the plurality of first supply holes are arranged at predetermined intervals or in a predetermined pattern in a circumferential direction.

According to (3), since the plurality of first supply holes are arranged at a predetermined interval or in a predetermined pattern in the circumferential direction, the refrigerant can be uniformly discharged over the entire circumference.

(4) The rotating electric machine according to (2) or (3), where
a plurality of the second supply holes are provided, and
the plurality of second supply holes are arranged at the same position in a radial direction and at a predetermined interval or a predetermined pattern in the circumferential direction.

According to (4), since the plurality of second supply holes are arranged at the same position in the radial direction and at a predetermined interval or a predetermined pattern in the circumferential direction, the refrigerant can be uniformly discharged over the entire circumference.

(5) The rotating electric machine according to any one of (2) to (4), where
the end surface plate includes,
an annular plate portion (annular plate portion 53) extending along an outer surface on the one side of the rotor core and a tubular portion (tubular portion 54) protruding along the one side from an outer peripheral edge of the annular plate portion,
the first supply hole is provided on an outer peripheral surface (outer peripheral surface 54a) of the tubular portion, and
the second supply hole is provided in the annular plate portion.

According to (5), the first supply hole is provided on the outer peripheral surface of the tubular portion and the second supply hole is provided on the annular plate portion. Therefore, by adjusting the axial length of the tubular portion, it is possible to adjust the position of the distal region of the coil end portion where the refrigerant discharged from the second supply hole hits.

(6) The rotating electric machine according to any one of (1) to (5), where
the rotor core is provided with a distribution plate having an in-plate flow path (inner diameter side refrigerant flow path 81A and outer diameter side refrigerant flow path 82A), and
the distribution plate communicates with an in-shaft flow path (in-shaft flow path 21) of a rotor shaft (rotor shaft 20) and distributes the refrigerant supplied from the in-shaft flow path to the first refrigerant flow path and the second refrigerant flow path.

According to (6), the distribution plate communicating with the in-shaft flow path of the rotor shaft can distribute the refrigerant to the first refrigerant flow path and the second refrigerant flow path on the upstream side of the end surface plate.

(7) The rotating electric machine according to any one of (2) to (5), where
the second supply hole is provided with a reservoir portion (reservoir portion 62b) for storing the refrigerant discharged from the second refrigerant flow path.

According to (7), since the reservoir portion is provided in the second supply hole, the refrigerant discharged from the second refrigerant flow path can be temporarily stored. Therefore, the amount of refrigerant supply to the distal region of the coil end portion can be adjusted (stabilized).

(8) The rotating electric machine according to (7), where
an outer diameter side wall portion (outer diameter side wall portion 62a) of the second supply hole is located further on a radial outer side than an outer diameter side wall portion (outer diameter side wall portion 312a) of the second refrigerant flow path, and
the reservoir portion is formed by a step portion (step portion 64) formed between the outer diameter side wall portion of the second supply hole and the outer diameter side wall portion of the second refrigerant flow path.

According to (8), the reservoir portion can be easily formed by forming the step portion between the outer diameter side wall portion of the second supply hole and the outer diameter side wall portion of the second refrigerant flow path.

(9) The rotating electric machine according to any one of (2) to (5), where
the second supply hole is provided with a refrigerant guide portion (refrigerant guide portion 63) which guides the refrigerant discharged from the second refrigerant flow path toward a distal region side of the coil end portion.

According to (9), the refrigerant discharged from the second refrigerant flow path can be guided toward the distal region side of the coil end portion by the refrigerant guide portion of the second supply hole.

(10) The rotating electric machine according to (9), where
the refrigerant guide portion is configured such that the outer diameter side wall portion of the second supply hole is inclined or curved radially outward from the second refrigerant flow path toward the distal region side of the coil end portion.

According to (10), the refrigerant can be guided toward the distal region side of the coil end portion by the inclined surface or the curved surface.

(11) The rotating electric machine according to (9), where
the refrigerant guide portion is a spiral groove (spiral groove 65) provided on an inner peripheral surface of the second supply hole.

According to (11), the refrigerant can be guided toward the distal region side of the coil end portion by the spiral groove.

(12) The rotating electric machine according to any one of (1) to (11), where
a magnet (magnet 41) is provided in a magnet placement portion (magnet attachment groove 41A) of the rotor core, and
the first refrigerant flow path is formed by a flux barrier (flux barrier 34) provided in the magnet placement portion.

According to (12), by forming the first refrigerant flow path using the flux barrier provided in the magnet placement portion, it is possible to avoid a complicated structure of the rotor core. Also, since the magnet can be cooled directly, the efficiency of the rotating electric machine is improved.

(13) The rotating electric machine according to (12), where
the magnet placement portion is provided on an outer peripheral surface of the rotor core,
a filament winding layer (filament winding layer 40) is provided on the outer peripheral surface where the magnet is arranged, and
the first refrigerant flow path is configured by covering the flux barrier with the filament winding layer.

According to (13), the first refrigerant flow path can be formed using the flux barrier even in an SPM-type rotating electric machine.

(14) The rotating electric machine according to any one of (1) to (13), where the rotor core is provided with magnetic pole portions at predetermined intervals in the circumferential direction, and the second refrigerant flow path is located between the magnetic pole portion and the magnetic pole portion which are adjacent in the circumferential direction.

According to (14), both magnetic pole portions adjacent in the circumferential direction can be cooled by the refrigerant passing through the second refrigerant flow path.

The invention claimed is:

1. A rotating electric machine comprising:
a rotor and a stator facing each other via a predetermined gap in a radial direction, wherein:
the rotor includes:
a rotor core having a refrigerant flow path through which refrigerant passes; and
an end surface plate arranged at least on one side of the rotor core in an axial direction;
the refrigerant flow path includes:
a first refrigerant flow path in which the refrigerant flows in the axial direction; and
a second refrigerant flow path which is disposed further on a radial inner side than the first refrigerant flow path and in which the refrigerant flows in the axial direction;
the stator includes:
a stator core; and
a coil end portion protruding from at least one side of the stator core in the axial direction; and
the end surface plate includes:
a root side refrigerant supply portion which communicates with the first refrigerant flow path and supplies the refrigerant to a root region of the coil end portion; and
a distal side refrigerant supply portion which communicates with the second refrigerant flow path and supplies the refrigerant to a distal region of the coil end portion.

2. The rotating electric machine according to claim 1, wherein:
the root side refrigerant supply portion is a first supply hole formed of a notch or a through-hole provided on an outer peripheral surface of the end surface plate; and
the distal side refrigerant supply portion is a second supply hole formed of a through-hole penetrating the end surface plate from the axial direction.

3. The rotating electric machine according to claim 2, wherein:
a plurality of the first supply holes are provided; and
the plurality of first supply holes are arranged at predetermined intervals or in a predetermined pattern in a circumferential direction.

4. The rotating electric machine according to claim 2, wherein:
a plurality of the second supply holes are provided; and
the plurality of second supply holes are arranged at the same position in a radial direction and at a predetermined interval or a predetermined pattern in the circumferential direction.

5. The rotating electric machine according to claim 2, wherein:
the end surface plate includes an annular plate portion extending along an outer surface on the one side of the rotor core and a tubular portion protruding along the one side from an outer peripheral edge of the annular plate portion;
the first supply hole is provided on an outer peripheral surface of the tubular portion; and
the second supply hole is provided in the annular plate portion.

6. The rotating electric machine according to claim 2, wherein
the second supply hole is provided with a reservoir portion for storing the refrigerant discharged from the second refrigerant flow path.

7. The rotating electric machine according to claim 6, wherein:
an outer diameter side wall portion of the second supply hole is located further on a radial outer side than an outer diameter side wall portion of the second refrigerant flow path; and
the reservoir portion is formed by a step portion formed between the outer diameter side wall portion of the second supply hole and the outer diameter side wall portion of the second refrigerant flow path.

8. The rotating electric machine according to claim 2, wherein
the second supply hole is provided with a refrigerant guide portion which guides the refrigerant discharged from the second refrigerant flow path toward a distal region side of the coil end portion.

9. The rotating electric machine according to claim 8, wherein
the refrigerant guide portion is configured such that the outer diameter side wall portion of the second supply hole is inclined or curved radially outward from the second refrigerant flow path toward the distal region side of the coil end portion.

10. The rotating electric machine according to claim 8, wherein
the refrigerant guide portion is a spiral groove provided on an inner peripheral surface of the second supply hole.

11. The rotating electric machine according to claim 1, wherein
the rotor core is provided with a distribution plate having an in-plate flow path, and
the distribution plate communicates with an in-shaft flow path of a rotor shaft and distributes the refrigerant supplied from the in-shaft flow path to the first refrigerant flow path and the second refrigerant flow path.

12. The rotating electric machine according to claim 1, wherein
a magnet is provided in a magnet placement portion of the rotor core, and
the first refrigerant flow path is formed by a flux barrier provided in the magnet placement portion.

13. The rotating electric machine according to claim 12, wherein:
the magnet placement portion is provided on an outer peripheral surface of the rotor core;
a filament winding layer is provided on the outer peripheral surface where the magnet is arranged; and
the first refrigerant flow path is configured by covering the flux barrier with the filament winding layer.

14. The rotating electric machine according to claim 1, wherein
the rotor core is provided with magnetic pole portions at predetermined intervals in the circumferential direction; and the second refrigerant flow path is located between the magnetic pole portion and the magnetic pole portion which are adjacent in the circumferential direction.

\* \* \* \* \*